United States Patent [19]

Honma

[11] 4,333,724

[45] Jun. 8, 1982

[54] PHOTOELECTRIC DETECTOR

[75] Inventor: Hiroshi Honma, Hino, Japan

[73] Assignee: Hochiki Corporation, Tokyo, Japan

[21] Appl. No.: 163,073

[22] Filed: Jun. 26, 1980

[30] Foreign Application Priority Data

Jun. 27, 1979 [JP] Japan ................................ 54-80095

Jul. 3, 1979 [JP] Japan ................................ 54-83446

[51] Int. Cl.³ ........................................ G01N 21/00

[52] U.S. Cl. .................................. 356/437; 356/438

[58] Field of Search .............................. 356/432-442

[56] References Cited

U.S. PATENT DOCUMENTS 3,316,410 4/1967 Meili et al. .

3,973,852 8/1976 Moore et al. ....................... 356/438

3,995,960 12/1976 Fletcher et al. .................... 356/437

4,200,399 4/1980 Kimble et al. ...................... 356/437

*Primary Examiner*—John K. Corbin

*Assistant Examiner*—Bruce Y. Arnold

*Attorney, Agent, or Firm*—Max Fogiel

[57] ABSTRACT

In a photoelectric detector having a light transmitting section and a light receiving section disposed remote from each other, intermittent illumination of a light source of the light transmitting section is detected and processed by the light receiving section in synchronism with the intermittent illumination by way of power lines interconnecting the light transmitting and light receiving sections. To this end, a circuit for intermittently supplying a power source to the light transmitting section is provided in the light transmitting section or the light receiving section and the intermittent power supply is utilized as a synchronizing signal to intermittently illuminate the light source and to allow the light receiving section to transmit and process a received light signal or a signal based thereon in synchronism with the intermittent illumination.

3 Claims, 11 Drawing Figures

PHOTOELECTRIC DETECTOR

BACKGROUND OF THE INVENTION

1. Field of the Invention

This invention relates to a photoelectric device having a light transmitting section and a light receiving section disposed remote from each other, and more particularly to a photoelectric detector of this type which detects cut-off or attenuation of transmitted light beams due to intervention of smoke etc. in space between the light transmitting and receiving sections, by synchronizing the operation of the light receiving section with the operation of the light transmitting section.

2. Description of the Prior Art

In general, to measure a concentration of smoke or transmission of light in space, light from a light transmitting section, having a light source, is detected by a light receiving section to obtain a transmission or extinction of the light between the light transmitting and light receiving sections. However, the light receiving section is subject to various disturbing foreign light, such as modulated light, (as from a fluorescent lamp nearby), incident thereto as well as the light from the light source of the light transmitting section and, as is widely known, an accurate light transmission or extinction cannot be measured unless such foreign light is eliminated.

Heretofore, there have been proposed, to solve this problem, (1) a method wherein light radiated from the light transmitting section is modulated by a mechanical chopper and the modulated light is demodulated by the light receiving section, (2) a method wherein the light source of the light transmitting section is driven, for example, at 1 KHz and the received light signal is treated through a filter of 1 KHz, and (3) a method wherein the light source of the light transmitting section is intermittently driven at a modulated frequency and a signal, synchronized with the intermittent drive of the light source, is supplied to the light receiving section so as to allow the light receiving section to treat only received light signals synchronized with the intermittent drive of the light source.

However, the conventional method (1) has such as a disadvantage that an apparatus for the method is generally expensive and not durable enough for long use because of the mechanical element employed in it, and the conventional method (2) also has as a disadvantage that the signal-to-noise ratio (SN ratio) of the received light signal to the foreign light is not satisfactory because high frequency components of the foreign light are possibly contained within a passband of the filter. In contrast, the conventional method (3) has a relatively excellent SN ratio of the received light signal to the foreign light since the modulated light is transmitted intermittently and the light receiving section receives the light in synchronism with the modulated light. Thus, this method has been widely used. However, where this method is applied to a fire sensor of a fire alarm system, the light transmitting and light receiving sections are supplied with a power source from a receiver of the fire alarm system and a special signal line or lines are additionally required to transmit and receive synchronizing pulses. Thus, the method (3) has a problem in installation of the lines. Since a separate type fire sensor is generally installed in a warehouse etc., and the light transmitting section is separated from the light receiving section by anywhere from several meters to several hundreds meters, such increases in the number of the lines provide a serious problem.

OBJECT OF THE INVENTION

It is therefore a general object of the present invention to provide a photoelectric detector which is capable of treating a received light signal at a light receiving section in synchronism with intermittent illumination at a light transmitting section without installing a special signal line or lines for synchronizing the operation of the light receiving section with the operation of the light transmitting section.

It is another specific object of the present invention to provide a photoelectric detector which is capable of effectively and easily supplying a power source even when the line resistance is considerably large.

It is still another specific object of the present invention to provide a photoelectric detector which is capable of preventing degradation in transmission characteristic due to mutual capacitance of power lines, eliminating delay in initiation of light source illumination and minimizing noise effects.

SUMMARY OF THE INVENTION

In accordance with the present invention, there is provided a photoelectric detector having a light transmitting section (including a light source,) and a light receiving section which receives and processes light signals from the light transmitting section. The two are disposed remote from each other and are connected through a power line for the purpose of detecting a change in the amount of transmitted light due to the cutting-off or attenuation of light beams between them. The power line is characterized by a power supply circuit for supplying a power source intermittently to the light transmitting section. There is a power supply detecting circuit for detecting the intermittent power supply and emitting a control signal depending upon the detected conditions, the intermittent power supply circuit and the power supply detecting circuit being provided in the light transmitting and light receiving sections, respectively. There is a light source drive circuit provided in the light transmitting section and adapted to have the illumination period controlled by the intermittent power supply or the control signal to illuminate the light source intermittently. Finally, there is a switch circuit provided in the light receiving section and driven by the control signal or the intermittent power supply for the purpose of controlling the transmission or processing of a received light signal or a signal based thereon in synchronism with the intermittent illumination of the light source.

DESCRIPTION OF THE PREFERRED EMBODIMENT

Figure 1:
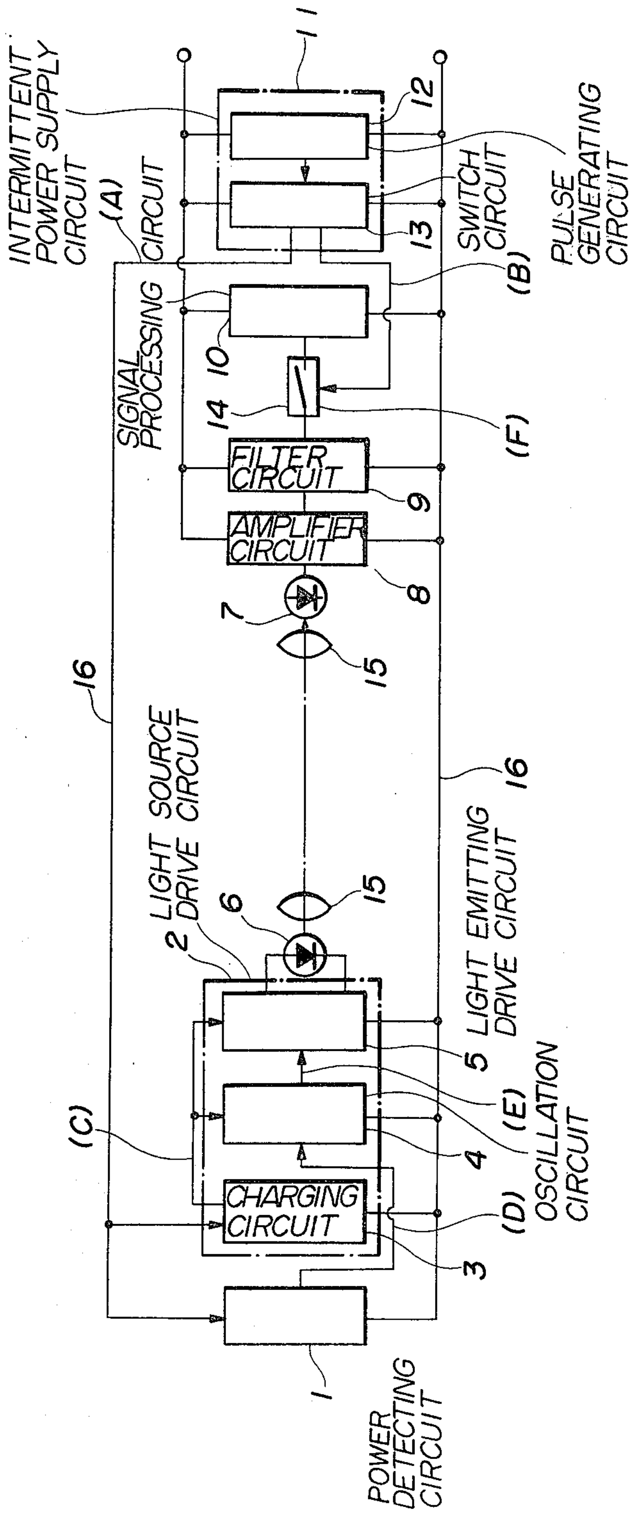
FIG. 1 is a block diagram of a first form of a photoelectric detector in accordance with the present invention.

FIG. 1 illustrates a first preferred form of a photoelectric detector embodying the present invention. In the figure, the photoelectric detector is comprised of a light transmitting section which includes a power detecting circuit 1, a light source drive circuit 2 and a light source 6 and a light receiving section which includes a photoelectric transducer circuit 7, an amplifier circuit 8, a filter circuit 9, a signal processing circuit 10, an intermittent power supply circuit 11 and a switch circuit 14. The light source drive circuit 2 has a charging circuit 3, an oscillation circuit 4 and a light emitting drive circuit 5. The intermittent power supply circuit 11 comprises a pulse generating circuit 12 and a switch circuit 13. The light transmitting section and the light receiving section are disposed remote from each other and interconnected through power lines 16, 16 and a light signal is transmitted from the light source 6 and received by the photoelectric transducer circuit 7 through optical systems 15 such as lenses.

Figure 2:
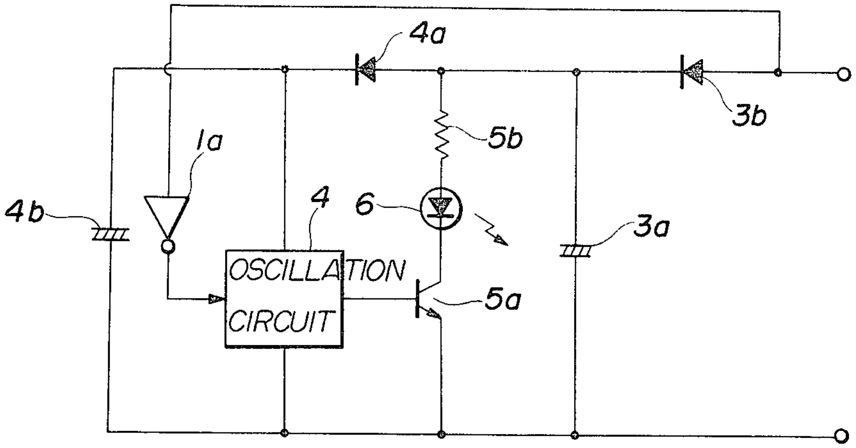
FIG. 2 is a circuit diagram of a specific arrangement of a light transmitting section of the photoelectric detector illustrated in FIG. 1.

The power supply detecting circuit 1 is formed, for example, of an inverter 1*a*, as illustrated in FIG. 2, and connected to the power lines 16 for the purpose of detecting power supply. The power detecting circuit 1 produces a control signal when no power is supplied and the signal is inputted to the oscillation circuit 4. Any means will suffice for the power detecting circuit 1 if it can control the operation of the oscillation circuit, and therefore the oscillation circuit 4 may include means functioning to operate or not to operate depending upon the presence or absence of voltage between the power lines 16, 16. Since power is intermittently supplied to the light transmitting section from the intermittent power supply circuit 11, as will be described in detail later, the control signal is also outputted intermittently in synchronism with the power source.

The charging circuit 3 is formed, for example, of a capacitor 3*a* and a diode 3*b* as illustrated in FIG. 2 and adapted to charge a power supply electric charge, (supplied intermittently from the intermittent power supply circuit 11,) and discharge, when no power is supplied, the charged electric charge in response to the control signal from the power detecting circuit 1 for driving the light source 6. A resistor or a constant current circuit may be provided in series with the diode 3*b* to reduce a rush current to the charging circuit 3. In the circuit arrangement of FIG. 2, a diode 4*a* and a capacitor 4*b* are provided to prevent fluctuation of the voltage of the power source to the oscillation circuit 4 due to charging and discharging.

The oscillation circuit 4 and the light emitting drive circuit 5, in combination, intermittently illuminate the light source 6 at a given frequency. The oscillation circuit 4 oscillates at the given frequency when the control signal from the power detecting circuit 1 is inputted to it and an output of the oscillation circuit 4 is supplied to the light emitting drive circuit 5. The light emitting drive circuit 5 is connected to the charging circuit 3 and illuminates the light source 6 by utilizing the charged electric charge. The light emitting drive circuit 5 is formed, for example, of a transistor 5*a* and a resistor 5*b* as illustrated in FIG. 2. The base of the transistor 5*a* is connected to an output terminal of the oscillation circuit 4 so that the charged electric charge of the charging circuit 3 is interruptedly discharged and modulated in response to the output of the oscillation circuit 4, in order to illuminate the light source 6 interruptedly at the given frequency.

The light source is formed, for example, of a light emitting diode and illuminated by the light emitting drive circuit 5. As the light source 6, there may be employed other devices which can respond to the modulated frequency, for example, a semiconductor laser, a discharge tube, etc.

The photoelectric transducer circuit 7 is formed of a photo diode, a photo transistor, a photoelectric tube, a photoconductive cell, etc. and converts a light signal from the light source 6 into an electric signal. The amplifier circuit 8 amplifies the light signal converted into the electric signal by the photoelectric transducer circuit 7 (hereafter referred to as "a received light signal"). The filter circuit 9 only passes a signal of the given frequency component among the amplified received light in order to eliminate noises. The signal processing circuit 10 compares the received light signal with a reference value and produces an alarm signal when the received light signal is lower than the preset level. These circuits are generally identical with those employed in conventional transmission measuring apparatus etc.

The intermittent power supply circuit 11 includes a pulse generating circuit 12 and a switch circuit 13 and acts to intermittently supply a power source to the light transmitting section and drive a switch circuit 14, which will be described in detail later. The pulse generating circuit 12 produces pulses, having given pulse widths and given pulse intervals, as signals for intermittently supplying a power source to the light transmitting section. The ratio of the pulse interval to the pulse width is determined by an impedance of the power line 16 and an interval of the intermittent illumination of the light source 6 and it may be selected, for example, to be 10 to 1. The switch circuit 13 transmits the pulses to the light transmitting section through the power line 16 and produces pulses having waveforms inverted with respect to the former pulses. The inverted pulses are supplied to the switch circuit 14 as an inverted output with respect to the intermittent power supply and drive the switch circuit 14.

The switch circuit 14 has a characteristic as of, for example, an analog switch and is inserted between the filter circuit 9 and the signal processing circuit 10 to allow the received light signal to be supplied to the signal processing circuit 10 in response to the inverted output. In other words, the switch circuit 14 is closed when the inverted output is supplied and opened when the output is not supplied. The switch circuit 14 may be formed so as to conduct a similar operation by a signal having a phase synchronized with the intermittent power supply. In this connection, it is to be noted that the opening and closing of the switch means not only the mere opening and closing of the switch in a narrow sense but a condition where transmission or processing of the received light signal or a signal based thereon is enabled or disabled. Therefore, the switch circuit 14 may be located in other positions where it can switch the received light signal inputted to the signal processing circuit 10, or the signal processed by the circuit 10. Further, the switch circuit 14 may be so formed that it normally keeps the signal processing circuit 10 in a reset position and puts the circuit 10 into a set position when the received light signal is inputted thereto.

Figure 3:
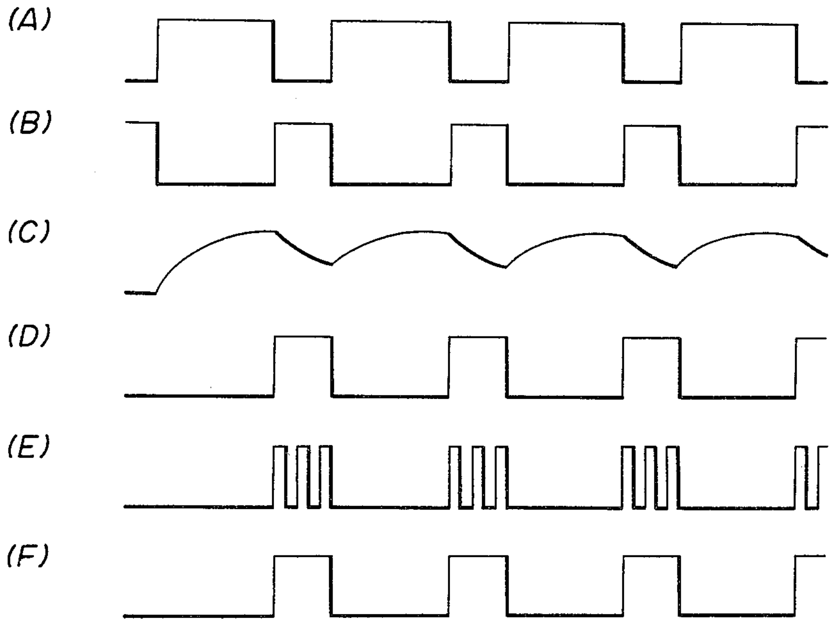
FIG. 3 is a time chart showing the operation conditions of the photoelectric detector illustrated in FIG. 1.

FIG. 3 illustrates operation conditions of the photoelectric detector in accordance with the present embodiment. In the figure, (A) to (F) show voltage/current waveforms at positions designated by the same marks in FIG. 1, respectively.

The intermittent power supply circuit 11 intermittently supplies a power source to the light transmitting section by way of the power line 16. FIG. 3(A) shows a waveform of the power supply. At the same time, the intermittent power supply circuit 11 supplies the inverted output with respect to the intermittent power supply to the switch circuit 14. A waveform of the inverted output is shown by FIG. 3(B). In this connection, it should be noted that since it suffices that the inverted output can open the switch circuit 14 when the power is supplied to the light transmitting section, it does not need the inverted output from the switch circuit 13 if it can assure such an operation and it may be formed, for example, of pulses outputted from the pulse generating circuit 12.

On the other hand, at the light transmitting section, the power supply detecting circuit 1 detects intermittent power supply and outputs the control signal synchronized with the inverted output as shown by FIG. 3(D). In response to the control signal, the oscillation circuit 4 intermittently oscillates at the given frequency (e.g. several KHz). FIG. 3(E) shows a waveform of the output from the oscillation circuit 4.

The charging circuit 3 is charged with the intermittent power supply and discharges the charged electric charge through the light emitting drive circuit 5 when no power is supplied. FIG. 3(C) shows changes in voltage according to the charge and discharge. As is apparent from FIG. 3(C), charging and discharging are carried out in synchronism with the intermittent power supply. Since the charging time constant of the charging circuit 3 is determined by the capacitance of the capacitor 3*a*, the line resistance of the power line, etc., a pulse width for the power supply is selected which preferably is sufficiently long compared with a pulse width for light source driving so that the capacitor 3*a* may easily charge to a required electric charge during the power supply period even where the lin resistance is large.

The light source 6 is driven by a power supply of the charged electric charge at the capacitor 3*a* in response to the output of the oscillation circuit 4 and illuminated intermittently in a waveform similar to that of the output of the oscillation circuit 4. In this case, since the major portion of the power consumed by the light source 6 is the power supply from the charged electric charge at the capacitor 3*a*, the illumination intensity or luminance is not affected by the line resistance. In this embodiment, although the charge stored at the capacitor 3*a* is gradually decreased from the start of the light source driving and the illumination intensity is also decreased with time, it may be compensated for by driving the transistor 5*a* of the light emitting drive circuit 5 by a constant current.

The light signal from the light source 6 reaches the switch circuit 14 through the photoelectric transducer circuit 7, the amplifier circuit 8 and the filter circuit 9. Since the switch circuit 14 is closed in synchronism with the inverted output of the intermittent power supply circuit 11 and the intermittent illumination of the light source 6 is also synchronized with the inverted output, only the received light signal from the light source 6 is inputted to the signal processing circuit 10, and unsynchronized noises due to other disturbing foreign light are shut out.

Therefore, when the photoelectric detector of the present invention is used, for example, for an extinction sensitive fire sensor of separate type, influences of the disturbing foreign light can be minimized so that a SN ratio can be markedly improved and attenuation of the light signal due to presence of smoke can be detected with high precision. Further, when the photoelectric detector is used as an infrared trespass detector, influences of disturbing foreign light incident from other than a light source can be eliminated and detection can be carried out with high precision.

Although the oscillation circuit 4 provides for the light source drive circuit 2 to interruptedly illuminate the light source in the present embodiment, a mono pulse may suffice in case where a possibility of disturbing foreign light is relatively small. In this case, the oscillation circuit 4 may be omitted. Alternatively, the oscillation circuit 4 may be so connected to the light source drive circuit 2 as to be selectively operated according to necessity. The mono pulse may have a width smaller than the pulse width of the inverted pulse at its high level as shown in FIG. 3(B) and it may have a width corresponding to a width of one pulse of the continual pulses as shown in FIG. 3(E). These may also be applied to any other embodiment of the present invention, especially, to the embodiments which will be described hereafter.

Figure 4:
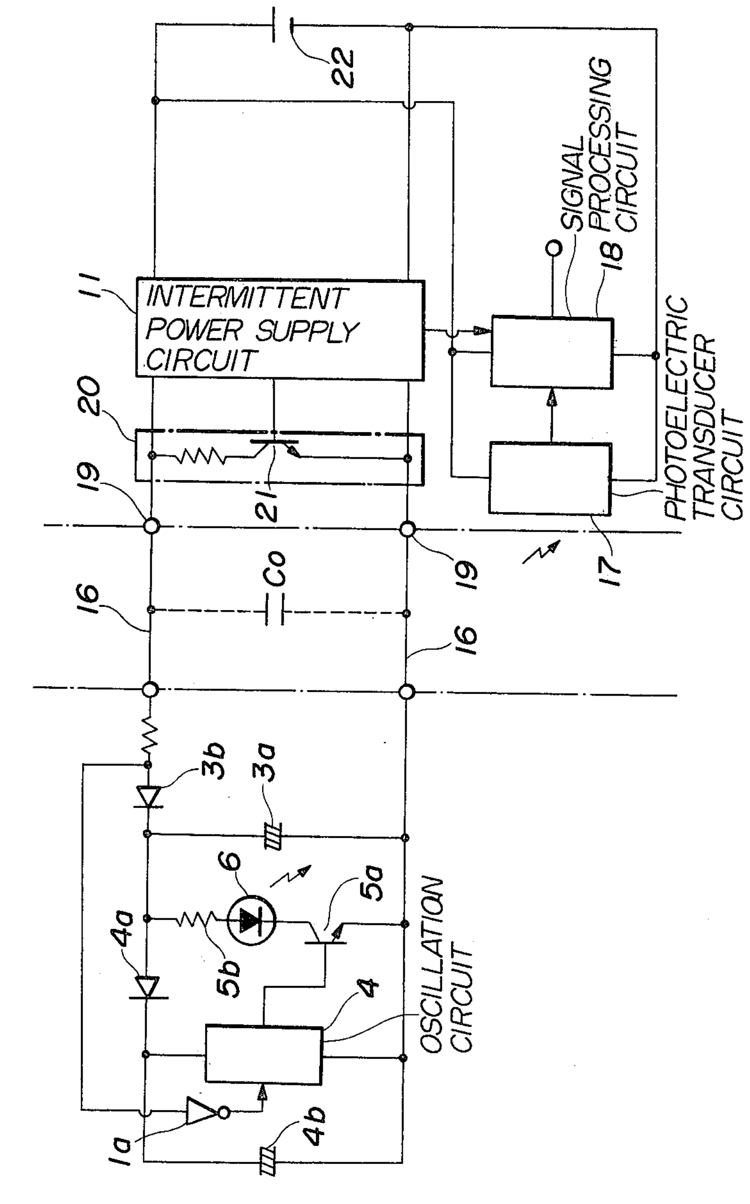
FIG. 4 is a block diagram of a second form of a photoelectric detector embodying the present invention.

FIG. 4 illustrates a second embodiment of the present invention. A photoelectric detector of this embodiment has a light transmitting section and a light receiving section arranged in the same manner as in the first embodiment and further has a short circuit 20. In the figure, numeral 17 designates a photoelectric transducer circuit including an amplifier circuit and a filter circuit and numeral 18 a signal processing circuit including a switch circuit. A diode 3*b* is provided for blocking any reverse flow of the charged electric charge of the capacitor 3*a*.

The short circuit 20 is connected between power output terminals 19, 19 of the light receiving section which communicate with power lines 16, 16 to the light transmitting section. The short circuit 20 decreases impedance between the power lines 16, 16 in synchronism with power shut-off of the intermittent power supply circuit 11, and discharges the electric charge of a line capacitance Co in a short period of time. To this end, for example, as illustrated in FIG. 4, a switching transistor 21 is connected to the power output terminals 19, 19 through a suitable protective resistor. However, the short circuit 20 may be formed from another circuit which can function similarly.

The intermittent power supply circuit 11 is comprised, as in the first embodiment, of a pulse generating circuit (not illustrated) and a switch circuit (not illustrated) and supplies an electrical charge from a power source 22 to the light transmitting section through the power line 16 in synchronism with a pulse interval of pulses produced by the pulse generating circuit. On the other hand, a signal synchronized with the power shut-off is extracted from the pulse generating circuit and inputted to the base of the switching transistor 21.

This embodiment advantageously prevents delay in initiation starting light source illumination and in of discharging by the capacitor, due to delay in detection by the power supply detecting circuit caused by the mutual capacitance of the lines 16, 16.

In the so formed arrangement of this embodiment, it will be seen that when the signal, synchronized with power shut-off of the intermittent power supply circuit 11 is supplied, the switching transistor 21 is turned on in order to render the lines 16, 16 conductive, and the electric charge of the line capacitance Co is discharged. When the voltage between the lines 16, 16 is lower than a predetermined value, the power supply detecting circuit 1 formed, for example, of the inverter 1*a*, detects this shut-off of the power supply and the oscillation circuit 4 starts to operate to conduct the transistor 5*a* interruptedly. As a result, the light source 6 made of a light emitting diode illuminates interruptedly using the charge of the capacitor 3*a* as a power source. In this case, if the impedance of the short circuit in its conductive state is selected sufficiently small, the time constant can be small and the charge can be discharged in a short period. Therefore, the oscillation circuit 4 can start immediately after the power supply shut-off and the photo diode of the light source 6 can also immediately start illumination.

Figure 5:
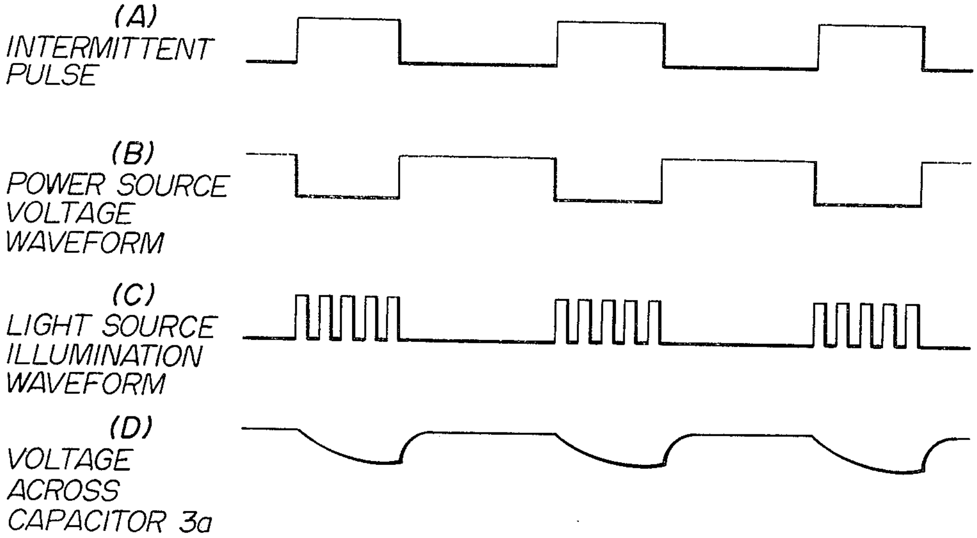
FIG. 5 is a time chart showing signal waveforms at various portions of the photoelectric detector illustrated in FIG. 4.
Figure 6:
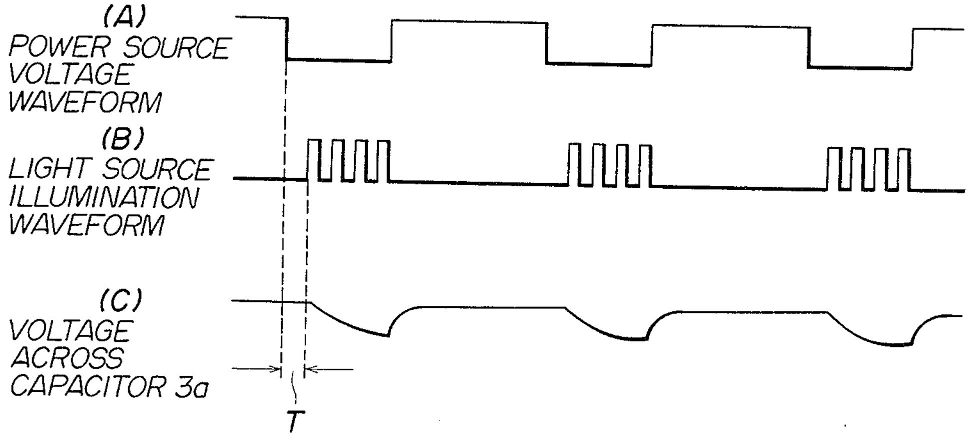
FIG. 6 is a time chart showing delay in starting of light source illumination due to mutual capacitance of power lines.

Signal waveforms of various portions of the present photoelectric detector are shown in FIG. 5. FIG. 5(A) shows pulses outputted from the pulse generating circuit in the intermittent power supply circuit 11. FIG. 5(B) shows power source pulses intermittently outputted from the intermittent power supply circuit 11 in synchronism with the pulses of FIG. 5(A) but in opposite phases. FIG. 5(C) shows illumination pulses of the light source 6 which intermittently illuminates in synchronism with the pulses of FIG. 5(A). There is no substantial delay in commencing illumination and accordingly no decrease in the number of pulses. FIG. 5(D) shows changes in voltage across the capacitor 3*a* for light source driving and there is no significant delay in starting the discharge. FIG. 6 shows a waveform of light source illumination and a voltage across the capacitor 3*a* when the short circuit 20 is not operated. As is apparent from FIG. 6, a delay time T can be reduced very much by operating the short circuit 20.

Figure 7:
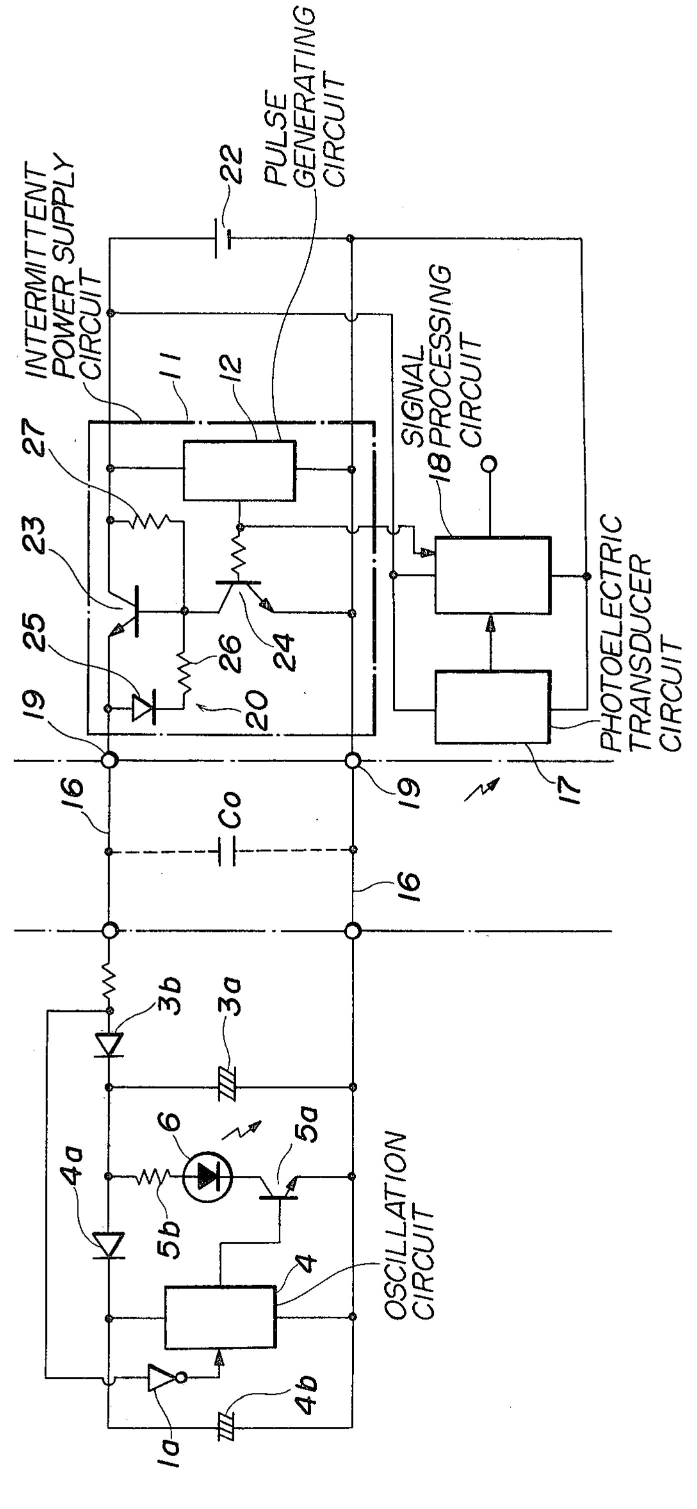
FIG. 7 is a block diagram of a third form of a photoelectric detector embodying the present invention.

FIG. 7 illustrates a third embodiment which is a modification of the second embodiment. In a photoelectric detector of this embodiment, a short circuit 20 to be inserted between the power output terminals 19, 19 is functionally included in an intermittent power supply circuit 11.

This intermittent power supply circuit 11 is comprised of a transistor 23 connected in series with the power line 16, a transistor 24 for on-off controlling the transistor 23 and a pulse generating circuit 12 for intermittently conducting the transistor 24. The short circuit 20 is formed by connecting the transistor 24 to the power output terminal 19 through a diode 25 and a suitable protective resistor 26.

According to this embodiment, when there is no output from the pulse generating circuit 12, the transistor 24 is in a nonconductive state and the transistor 23 conducts the supply charge from a power source 22 to a capacitor 3*a* of the light transmitting section. When a pulse is emitted from the pulse generating circuit 12, the transistor 24 becomes conductive and the transistor 23 becomes nonconductive. As a result, the power supply is shut off and the charge of the line capacitance Co of the power line 16 is discharged through the diode 25, the resistor 26 and the transistor 24. Then, the light source 6 starts to illuminate in the same manner as the embodiment of FIG. 4 and illumination pulses as shown in FIG. 5(C) are obtained. At this time, a current flowing from the power source 22 through a resistor 27 is blocked by the diode 25 and not supplied to the light transmitting section. In this connection, it is to be noted that an output from the pulse generating circuit 12 provides a synchronizing signal to the signal processing circuit 18 as well as drives the transistor 24.

The second and third embodiments as described above have the effect of minimizing delay in the initiation of illumination of the light source and allowing effective intermittent illumination of the light source without reducing the number of illumination pulses by discharging the mutual capacitance of the power lines during the power supply to the light transmitting section. Furthermore, in these embodiments, since the light source is driven only when the short circuit has a low impedance, the line impedance during the power source driving is extremely low and the time when a gate of the signal processing circuit is opened can be short. Thus, the anti-noise characteristic can be improved.

Figure 8:
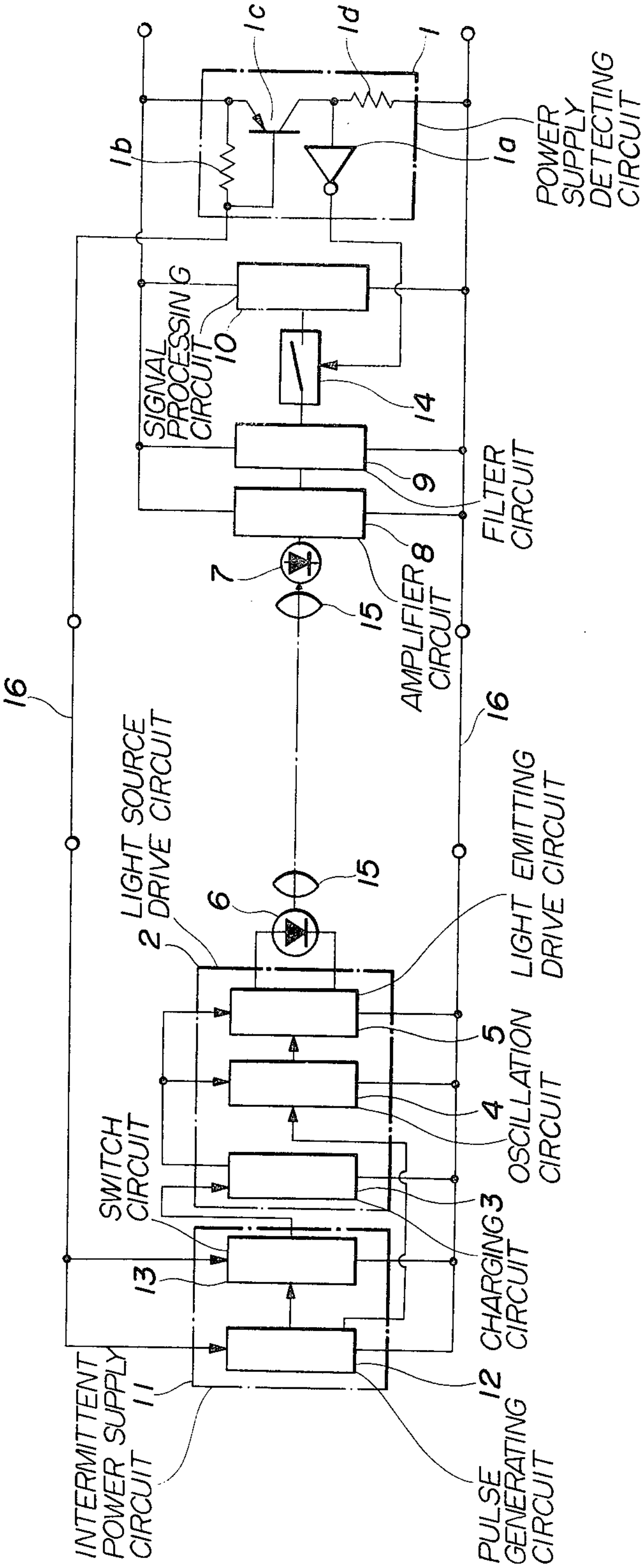
FIG. 8 is a block diagram of a fourth form of a photoelectric detector in accordance with the present invention.

The fourth embodiment of the present invention is illustrated in FIG. 8. A photoelectric detector illustrated in FIG. 8 has an intermittent power supply circuit 11 and a light source drive circuit 2 in a light transmitting section and has a photoelectric transducer circuit 7, an amplifier circuit 8, a filter circuit 9, a signal processing circuit 10, a power supply detecting circuit 11 and a switch circuit 14 in a light receiving section.

Figure 9:
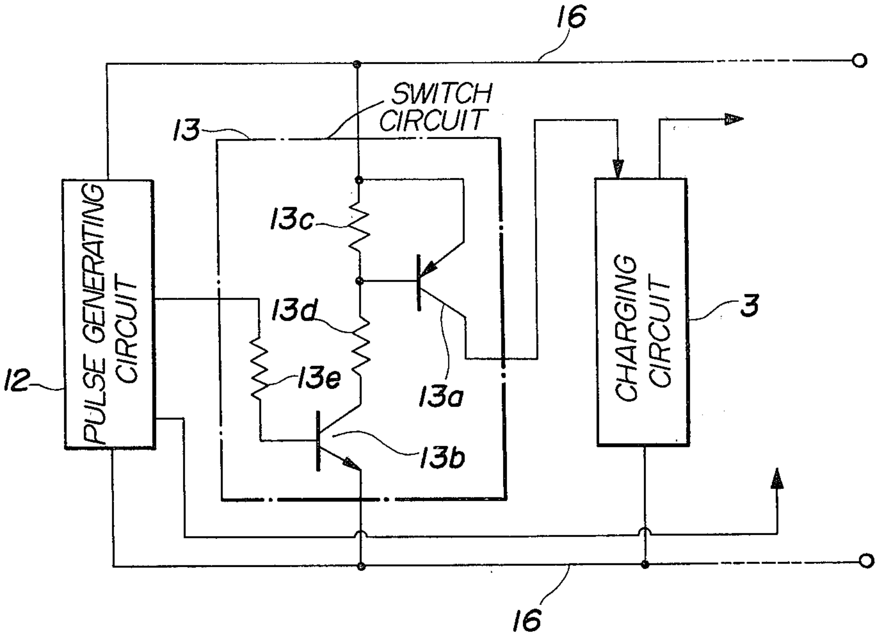
FIG. 9 is a circuit diagram of one example of a switch circuit employable in the photoelectric detector illustrated in FIG. 8.

The intermittent power supply circuit 11 is formed of a pulse generating circuit 12 and a switch circuit 13 as in the foregoing embodiments. The pulse generating circuit 12 supplies pulses of opposite phases to the switch circuit 13 and the oscillation circuit 4. The switch circuit 13 employable in the present embodiment is comprised, for example, of two transistors 13*a*, 13*b* and resistors 13*c*, 13*d*, 13*e* as illustrated in FIG. 9. In this switch circuit 13, the transistor 13*b* is turned on by a pulse outputted from the pulse generating circuit 12 and then the transistor 13*a* becomes conductive so as to connect the power line 16 to a charging circuit 3 to charge the same. When the said pulse falls, the transistors 13*b* and 13*a* become nonconductive to stop the charging.

The light source drive circuit 2 includes the charging circuit, an oscillation circuit 4 and a light emitting drive circuit 5 and is arranged so as to illuminate a light source 6 using charge of the charging circuit 3 in response to a pulse outputted from the pulse generating circuit 12 of the intermittent power supply circuit 11 and having an inverted waveform of the former pulse when no power source is supplied, i.e., when charging is not conducted.

The power supply detecting circuit 1 is comprised, for example, of a resistor 1*b* connected in series with a power line 16 to the light transmitting section, a transistor 1*c* connected to the resistor 1*b* between the base and emitter thereof, a resistor 1*d* connected to the collector of the transistor 1*c* and an inverter 1*a*. This power supply detecting circuit 1 detects a change in the current supplied to the light transmitting section through the power line 16 and outputs a control signal for closing a switch circuit 14 when no power is supplied. Though a current flows through the power line 16 even when charging is not conducted, in the present embodiment, this current is extremely small and will be consumed by the pulse generating circuit 12 so that it will by no means affect the detection by the power supply detecting circuit. Therefore, in fact, the current can be negligible so as to be treated as a power supply shut-off state.

Figure 10:
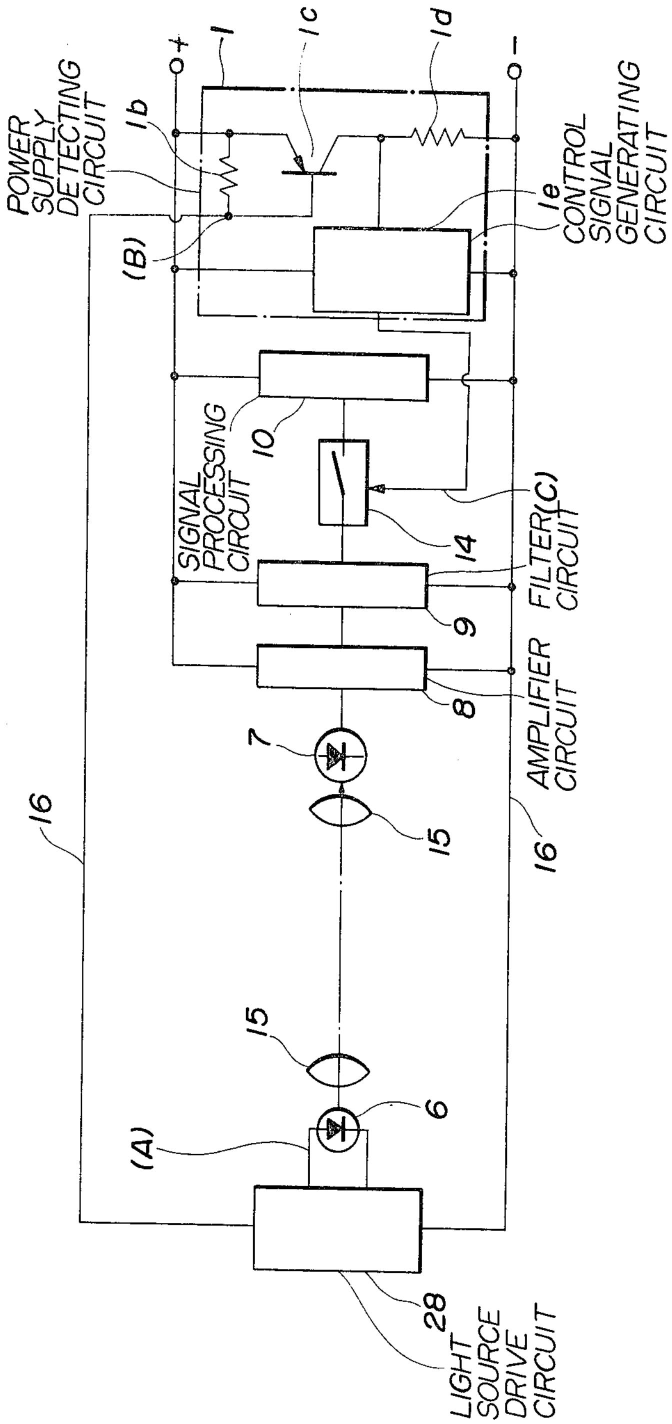
FIG. 10 is a block diagram of a fifth form of a photoelectric detector in accordance with the present invention.

FIG. 10 illustrates a fifth embodiment of the present invention. A photoelectric detector illustrated in FIG. 10 has a light source drive circuit 28 including an intermittent power supply circuit at a light transmitting section and has a power supply detecting circuit 1 and a switch circuit 14 at a light receiving section.

The light source drive circuit 28 includes, in addition to the intermittent power supply circuit, an oscillation circuit and a light emitting drive circuit and is so arranged as to be supplied intermittently a power source from the light receiving section through the intermittent power supply circuit by way of a power line 16, and to intermittently illuminate a light source by the oscillation circuit and the light emitting drive circuit using the so supplied power source.

The power supply detecting circuit 1 is comprised, for example, of a resistor 1*b* connected in series with the power line 16 to the light transmitting section, a transistor 1*c* connected, between the base and emitter thereof, to the resistor 1*b*, a resistor 1*d* connected to the collector of the transistor 1*c* and a control signal generating circuit 1*e*. The power supply detecting circuit 1 thus arranged detects a change in the current flowing to the light transmitting section through the power line 16 and outputs a control signal for closing a switch 14 at the time of power supply.

The control signal generating circuit 1*e* is formed, for example, of a retriggerable monostable multivibrator and detects an envelope based on the intermittent illumination of the light source from the detected change in the supplied current to output the control signal. Other components are similar to those in the first embodiment.

Figure 11:
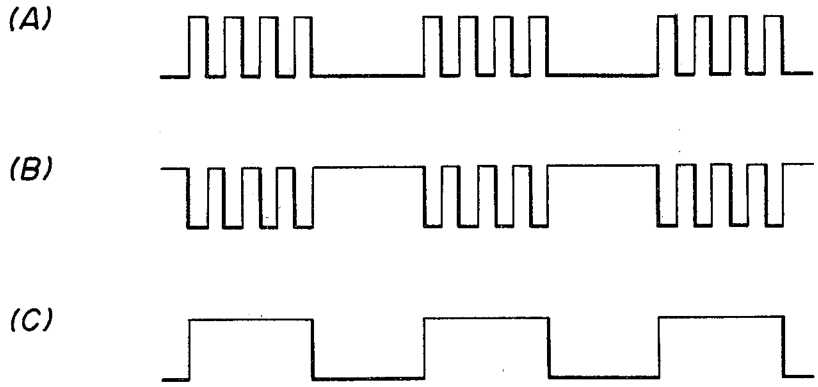
FIG. 11 is a time chart showing signal waveforms at various portions of the photoelectric detector illustrated in FIG. 10.

Signal waveforms at various portions of this photoelectric detector are shown in FIG. 11. FIG. 11(A) to (D) are voltage/current waveforms at portions indicated by the corresponding marks in FIG. 10.

When a pulse train as shown in FIG. 11(A) is intermittently supplied to the light source 6, the light source 6 intermittently emits an interrupted light corresponding to the pulses. On the other hand, since a drive current flows through the resistor 1*b* of the power supply detecting circuit 1 in response to the light emitted, a voltage drop as shown in FIG. 11(B) is caused. Accordingly, the transistor 1*c* is turned on and a voltage change is caused in the resistor 1*d* by the collector current. Then, in the control signal generating circuit 1*e*, an envelope of the pulses illuminating the light source 6 at a given frequency is extracted from the voltage change and the control signal as shown in FIG. 11(C) is outputted. The switch circuit 14 is then closed by the control signal in synchronism with the intermittent illumination of the light source 6 and a received light signal is inputted to the signal processing circuit 10 in synchronism with the intermittent illumination of the light source 6.

In the present embodiment, since a charging circuit is not required for driving the light source 6, the construction of the light source drive circuit can be simplified.

As described above, since the present invention requires no special signal line for synchronizing the light transmitting section with the light receiving section, there can be provided a photoelectric detector simple in installation and yet excellent in a SN ratio with respect to a disturbing foreign light.

I claim:

1. In a photoelectric detector wherein a light transmitting section including a light source and a light receiving section for receiving and processing a light signal from the light transmitting section are disposed remote from each other and connected through a power line to detect a change in a transmitted light amount due to cut-off or attenuation of light beams therebetween, the improvement comprising: an intermittent power supply circuit for intermittently supplying power to the light transmitting section and outputting a pulse corresponding to intermittently supplied power; a power detecting circuit for detecting the intermittent power to output a control signal depending upon the detected conditions; said intermittent power supply circuit and said power supply detecting circuit being provided in one and the other of the light transmitting section and the light receiving section, respectively; a light source drive circuit provided in the light transmitting section and adapted to be controlled with respect to the illumination period by the intermittent power supply or the control signal to illuminate the light source intermittently; and a switch circuit provided in the light receiving section and driven according to said control signal or said pulse to control transmission or processing of a received light signal or a signal based thereon in synchronism with the intermittent illumination of the light source; said power detecting circuit being provided in said light transmitting section; said intermittent power supply circuit is provided in the light receiving section; said light source drive circuit includes a charging circuit adapted to be charged during the power supply period and to illuminate said light source in response to the control signal from said power detecting circuit, using the charged electric charge at said charging circuit when no power is supplied; said intermittent power supply includes a pulse generating circuit for intermittently producing pulses to intermittently supply the power and to drive said switch circuit; and said switch circuit is driven by said pulses to operate for allowing transmission or processing of the received light signal or the signal based thereon when no power is supplied; a short circuit connected between the power source output terminals at the light receiving section which communicate with the power lines to the light transmitting section; said short circuit being adapted to made the impedance between the power lines low to discharge electric charge of mutual capacitance between the lines only during those periods when said intermittent power supply circuit does not power the light transmitting section.

2. A photoelectric device as claimed in claim 1 wherein said light source drive circuit includes an oscillation circuit for interruptedly discharging the charged electric charge at the charging circuit by an output of said oscillation circuit to interruptedly illuminate the light source at a given frequency.

3. A photoelectric detector as claimed in claim 1 wherein said light source drive circuit includes an oscillation circuit which is connected so as to be selectively operative or inoperative.

* * * * *